Inventor
UUNO V. HELAVA

INVENTOR
UUNO V. HELAVA
BY Cushman, Darby & Cushman
ATTORNEYS

March 1, 1966 U. V. HELAVA 3,237,511
PRECISE COMPARATOR
Filed April 16, 1962 4 Sheets-Sheet 3

Inventor
UUNO V. HELAVA
By Cushman, Darby & Cushman
Attorneys

March 1, 1966 U. V. HELAVA 3,237,511
PRECISE COMPARATOR
Filed April 16, 1962 4 Sheets-Sheet 4

Inventor
UUNO V. HELAVA
By Cushman, Darby & Cushman
Attorneys

United States Patent Office 3,237,511
Patented Mar. 1, 1966

3,237,511
PRECISE COMPARATOR
Uuno V. Helava, Ottawa, Ontario, Canada, assignor, by mesne assignments, to Canadian Patents and Development Limited, Ottawa, Ontario, Canada, a company
Filed Apr. 16, 1962, Ser. No. 187,588
5 Claims. (Cl. 88—14)

This invention relates to an apparatus for the accurate measurement of rectangular coordinates of features on a photographic image. It finds particular application in the use of comparators in photographic surveying.

Several comparators for this type of measurement are known, but basically they fall into two groups:

(1) Those having long lead screws or equivalent shifting elements, each used to measure the rectangular coordinate of an image feature with respect to a fixed origin in one step, and (2) Those wherein a precise grid plate enables the operator to choose a point on the image adjacent to the feature on the photograph to be measured from which point a pair of step off coordinates of the feature are measured. The step off coordinates are measured by moving the measuring mark, firstly centred over the feature by means of a pair of short lead screws until it is centred over the adjacent grid point.

Both these solutions have certain drawbacks. The comparators in group 1 must be extremely rigidly and carefully constructed to obtain the required accuracies over long ranges of the lead screws. Consequently, they are heavy and very expensive. Besides, these instruments are very sensitive to external disturbances such as temperature differences. The comparators in group 2 require double measurements (the measuring mark must be placed first on the point to be measured, and then on the nearest grid intersection). Obviously this takes more time than a single measurement and besides the accuracy is somewhat lower because of the two pointings, which are both affected by some observational error.

The two groups have their merits though, the instruments of the first group are practical in operation because the values of the coordinates are obtained in a single operation. The instruments of the second group have the advantage that, in general, the required degree of accuracy is much easier to obtain, the critical measurements using lead screws being made over short distances only. The grid plate can be accurately calibrated and is not likely to change its dimensions.

In following the teaching of the present invention, the advantages of both groups are obtained without encountering the disadvantages.

A specific embodiment of the invention will now be described having reference to the accompanying drawings in which like parts have like reference numerals and in which.

Figure 1:
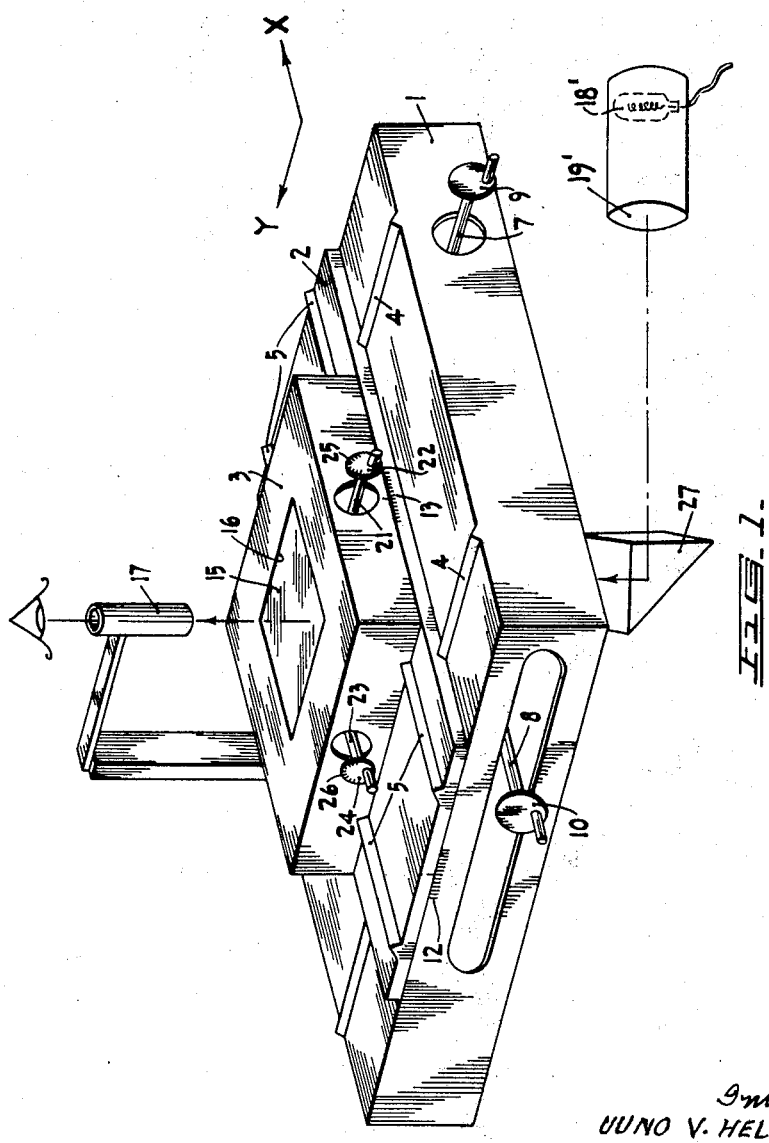
FIGURE 1 is an overall simplified perspective view of a comparator embodying the invention.

Making reference now to the drawings, a base frame 1 movably supports by means of rails 4, a carriage 2. Carriage 2 similarly supports on rails 5 a further carriage 3. The two carriages 2 and 3 are positioned with respect to their supporting surfaces by lead screw and nut assemblies 7 and 8 respectively, to be described later. The lead screws 7 and 8 are turned by hand wheels 9 and 10 respectively. A scale 12 is provided for indicating the relative positions of carriage 2 and base frame 1 and a scale 13 for the relative positions of carriages 2 and 3. A photograph 15 upon which image features are to be examined is mounted on a transparent plate 16 supported by carriage 3 beneath a viewing device 17. Light for device 17 originates at lamp 18', is collimated by lens 19' and is deflected upwards by prism 27.

Figure 2:
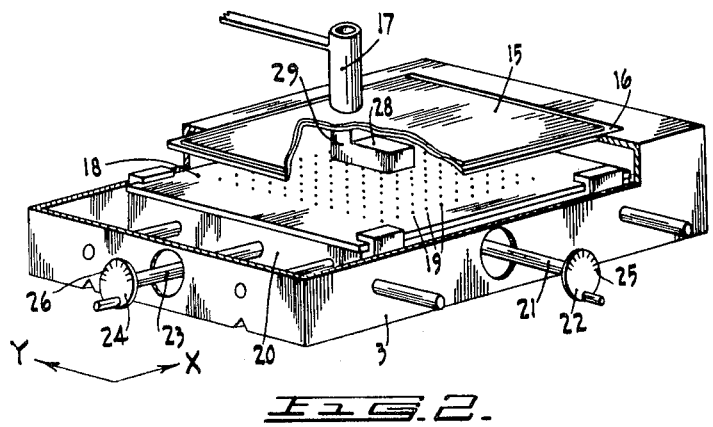
FIGURE 2 is a partly sectional and simplified view of a portion of the apparatus of FIGURE 1.

In FIGURE 2 the carriage 3 is shown in more detail. Mounted on carriage 3 and supported below photograph 15 and plate 16 is a second transparent plate 18 upon which are inscribed at the corners of imaginary squares of suitable side length (say 20 mm.), measuring marks 19. Plate 18 rests on supporting frame 20 which frame can be moved in the Y or ordinate direction relatively to carriage 3 by means of accurate short lead screw assembly 21 having handwheel 22. Plate 18 in turn can move relatively to frame 20 in the X or abscissa direction at right angles to the direction of movement caused by lead screw assembly 21, by means of a further accurate short lead screw assembly 23 having handwheel 24. These short screw assemblies need theoretically only move the plate 18 in the two directions by an amount equal to the side of the squares locating the marks 19, but it is preferable to allow for slightly more movement than this to permit some overlap. Vernier scales are provided for wheels 22 and 24 (shown diagrammatically by scales 25 and 26) to measure their position accurately in a known manner. The short screw assemblies and associated vernier scales must be manufactured using the same accurate techniques and care applied in the manufacture of precise micrometers as described later with reference to FIGURE 4. An optical system 28 is introduced between the plate 18 and the photograph 15 to bring the marks 19 and the surface of photograph 15 containing the image features into the same optical plane (for coincidence measurement) and to provide an upright real image of the marks at the photographic surface (this is also described later).

Figure 3:
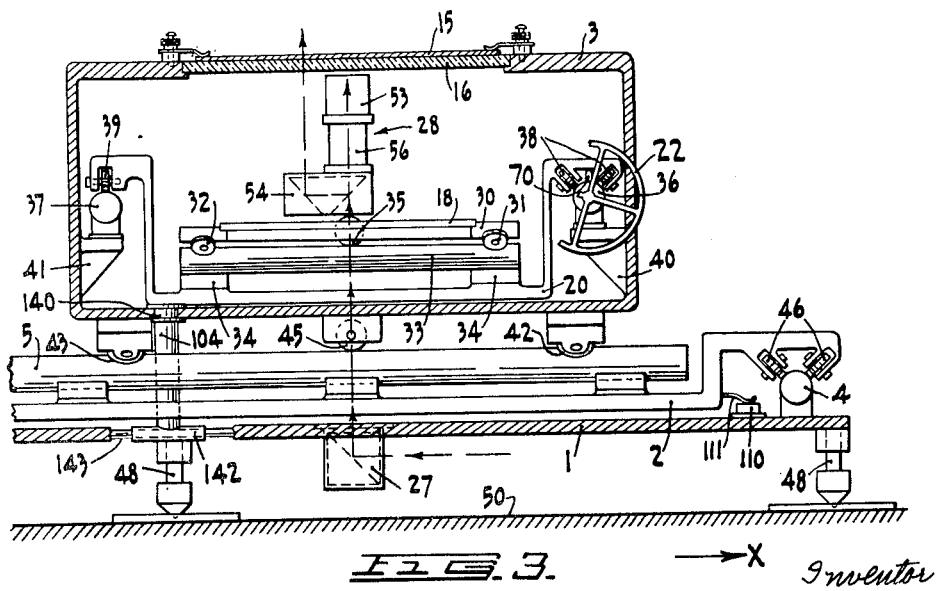
FIGURE 3 is a sectional side elevation of a practical embodiment of part of a precise comparator constructed in accordance with the invention.

In FIGURE 3 a more practical form of the apparatus briefly illustrated in FIGURES 1 and 2 is shown with the left hand portion of the apparatus omitted.

The plate 18 is mounted on a support 30 free to move on two pairs of wheels 31 and 32 along a tubular rail 33, these pairs, the second member of each of which is hidden behind the first, maintain and steer the front side of support 30 in the abscissa direction. The rail 33 is mounted on supports 34 upon frame 20. Behind rail 33 at the further side of the support 30 is a second rail similar to 33 for carrying that side through a vertically oriented wheel 35. Frame 20 is supported on tubular rails 36 and 37 by wheel pair 38 and vertically oriented wheel 39 respectively. A second wheel pair is provided behind pair 38 at the further side of frame 20 which completes the support for the frame and longitudinally steers the frame in the ordinate direction in cooperation with the pair 38. Rails 36 and 37 are borne on shoulders 40 and 41 from carriage 3.

Carriage 3 is supported and steered by wheel pairs 42 and 43 running on tubular rail 5. The further side of carriage 3 is maintained by vertically oriented wheel 45 running on a rail disposed behind rail 5 at the far side of the carriage. Finally carriage 2 is steered and supported by wheel pair 46 and a similar pair behind 46 at its far side. The left side of the carriage 2 (not shown) is supported from base 1 on a rail running parallel to rail 2 by a vertically oriented wheel. The base 1 has three legs 48 (only two are shown in FIGURE 3) arranged in triangular formation for levelling the whole apparatus on a supporting surface 50.

The prism 27 directs light up through the plate 18 and through the optical system 28 whence it passes through photograph 15 to the viewing device. System 28 is held rigidly with respect to base 1 by a suitable bracket 29 (shown in FIGURE 2 only). This system comprises two pairs of prisms for inverting and reversing the image of the surface of plate 18 containing marks 19, brought to a focus, by a lens, on the surface of the photograph 15, bearing the features to be examined.

Figure 4:
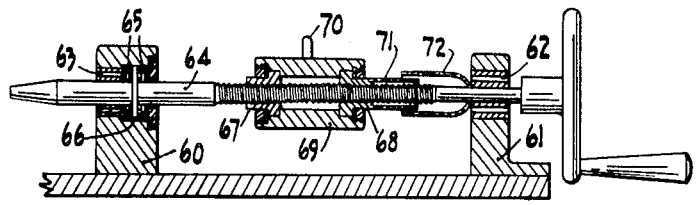
FIGURE 4 is a side elevation partly in section of an accurate lead screw assembly used in the apparatus of FIGURE 3.

FIGURE 4 shows a suitable structure for the accurate lead screw assemblies 21 and 23. The frame upon which the moved carriage concerned is supported carries bearing brackets 60 and 61, each bracket including a needle bearing race 62 and 63 for a shaft 64. One of the brackets 60 includes a twin thrust bearing 65 cooperating with a thrust disc 66 on the shaft 64. The central portion of the shaft 64 is threaded and passes through nuts 67 and 68 mounted in a housing 69. The nuts are secured by lock rings 70 and 71 and one nut is preferably adjustable with respect to housing 69 to take up any backlash in the coupling to the shaft 64.

When used for moving the plate 18 the shaft and housing of FIGURE 4 are inserted into the tubular rail supporting the carriage to be moved. Thus in FIGURE 3 for frame 20, shaft 64 passes through rail 36 the brackets 60 and 61 being located beyond the ends of the rail and mounted on shoulders firmly attached to carriage 3. Coupling from housing 69 to the carriage 20 is taken from a stud 70 on the housing through a small longitudinal slit (not shown) in the surface of rail 36. To take accurate measurement of the position of shaft 64 an ordinary micrometer vernier comprising inner shell 71 affixed to locknut 68 and outer shell 72 is employed. Handwheel 22 for operation of the lead screw assembly mounted on the end of shaft 64 serves for adjustment by the operator. There is a similar accurate lead screw assembly (not shown) associated with rail 33 for driving support 30. The adjustment of carriages 2 and 3 need not be made accurately since all that is necessary is to bring the image feature into the field of the viewing device 17. Thus these two carriages could be moved by hand if desired, or by a rack and pinion drive between the member carrying the rail concerned and the carriage in a manner known to those skilled in the art.

Figure 5:
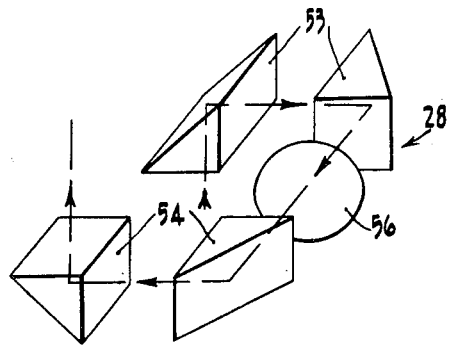
FIGURE 5 is a perspective view of an optical assembly employed in the apparatus of FIGURE 3.

FIGURE 5 shows in more detail a suitable structure for the optical system 28. The prism pair 53, comprising two 45° prisms receives light rays from the marked surface of the plate 18. The rays emerge horizontally and then pass through the lens 56, preferably compounded to be achromatic and to minimise spherical and astigmatic distortions, to the prism pair 54 from which the rays emerge vertically. The image of the plate 18 is brought to a focus on the image feature surface of photograph 15, as real and upright (being reversed twice, once by the prisms and once by the lens), and is in the ratio of 1 to 1 by arranging that the plate "object" marks 19 and the surface of the photograph are each spaced from centre of the lens by an optical distance of twice its focal length. It should be appreciated that if desired, and if the depth of focus of the viewing device 17 is adequate, the system 28 may be omitted and plate 18 and photograph 15 mounted adjacent one another, the plate 18 being movable as before. Coincidence of the image feature examined and the required mark 19 can then again be observed.

When the apparatus is in use, the operator will bring the image feature on the photograph 15 to be examined into the field of view of device 17 by moving handwheel 10 (FIGURE 1) or by shifting carriage 3 directly on rails 5 (FIGURE 3) for movement in the abscissa direction, and wheel 9 (FIGURE 1) or direct shifting of carriage 2 on rails 4 (FIGURE 3) for the ordinate direction. He can then determine from the reading of scales 12 and 13 (FIGURE 1) giving the rough coordinates of the feature which measuring mark 19 is the closest to the feature. To facilitate the identification of the requisite mark 19 each mark has noted adjacent to it the coordinates of that mark with respect to an origin near one corner of the plate 18 which coordinates will be visible in the viewing device 17. The operator will then bring the nearest mark 19 accurately into coincidence with the feature by operating abscissa handwheel 24 and ordinate wheel 22. The readings on the scales 26 and 25 when added algebraically to the coordinates of the mark 19 will give the accurate coordinates of the image feature, since the coordinates of the marks 19 are all known exactly when the scales 26 and 25 read zero and are equal to the numbers adjacent each mark. The term "characters" as used in the claims refers to numbers, letters, or any other symbols which may be used to identify the coordinates of a reference frame.

Figure 6:
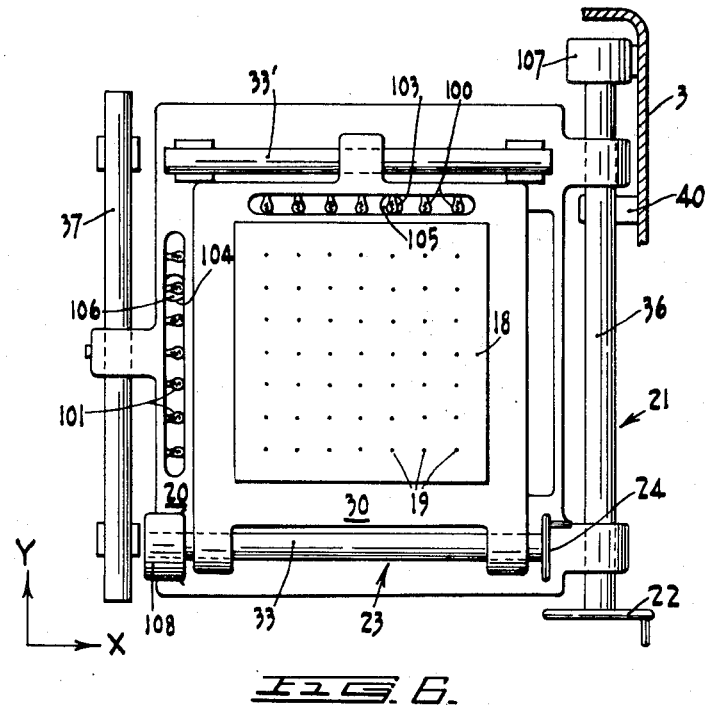
FIGURE 6 is a plan view of a part of FIGURE 3 embodying a preferred mechanism for aligning the measuring marks and the viewing device.

In one embodiment of the invention the need to read scales 12 and 13, or their equivalents, is avoided. As seen in FIGURE 6 two series of small lamps 100 and 101 having linear filaments are mounted on support 30 and on the frame 20 respectively so that there is a filament in line with each row (in the abscissa direction) and each column (in the ordinate direction) of the measuring marks 19. On the carriages 2 and 3 two photocell assemblies 103 and 104 are mounted respectively beneath the rows 100 and 101. Each photocell assembly contains a lens 105 and 106 respectively for projecting the image of the adjacent lamp onto the surface of a photocell (not shown). The photocells are both of the known type having a sensitive surface divided into two separate parts which can therefore be made to operate as two independent photocells side by side. The lens in each assembly 103 and 104 is adjusted so that the image of the adjacent lamp falls on the dividing line between the two sensitive parts when the column or row of marks with which the lamp corresponds is substantially on the optical axis of the viewing system (i.e. is at the centre of the field of view of the viewing device 17). Cell assembly 103 is mounted directly upon carriage 2 since the only movements between cell assembly 103 and lamp row 100 transversely to the row will be due to the small displacements of frame 20 along rails 36 and 37 (this displacement of filaments with respect to photocell can be accommodated by arranging the lens 105 in photocell assembly 103 to have a large enough field of view to bring an image of the filament concerned onto the photocell at the maximum transverse displacement encountered). Cell assembly 104 is not fixed with respect to carriage 3, however, because movements of carriage 3 in the X-direction would produce a transverse movement of lamp row 101 relatively to cell assembly 104 which could not economically be accommodated by design of lens 106. Assembly 104 is therefore mounted in a collar 140 (FIGURE 3) carried in a slot in carriage 3 extending in the Y-direction, which can allow movement of carriage 3 in the Y-direction with respect to the collar. Assembly 104 is also connected to a sleeve 142 which can slide along a rod 143, extending in the X-direction and secured to base frame 1. It can now be seen that the only transverse movements of lamp row 101 relatively to cell assembly 104 are those occasioned by the small displacements of grid plate support 30. This can be accommodated by arranging lens 106 to have a suitable field of view.

Each accurate lead screw assembly 21 and 23 is then equipped with a servo motor 107 and 108 respectively (see FIGURE 6) to turn the lead screw shaft. Each motor 107 and 108 is connected by known techniques to its respective photocells so that lead screws 21 and 23 are turned in a direction to centre the image of the adjacent illuminated filament on the dividing line between the separate parts of its photocell.

Figure 7:
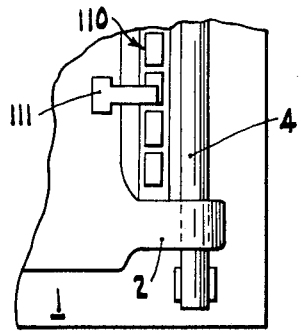
FIGURE 7 is a plan view of one part of the apparatus of FIGURE 3 showing a contact series in accordance with a preferred form of the invention.
Figure 8:
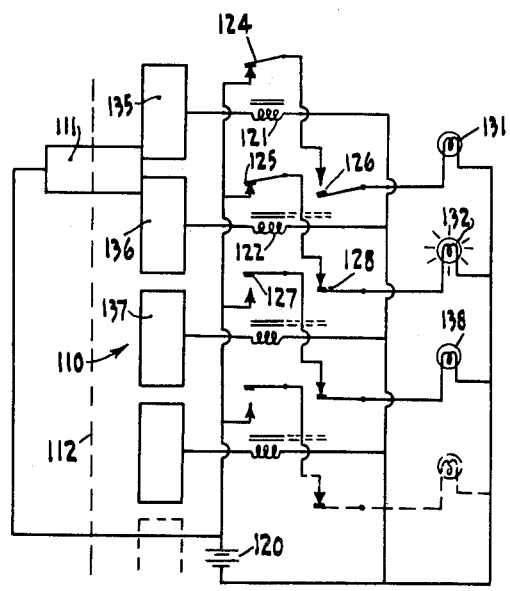
FIGURE 8 is a schematic circuit diagram associated with the preferred embodiment of FIGURES 6 and 7.

When this servo system is energised and the adjacent light is illuminated movements of carriage 3 in the abscissa or ordinate directions will provoke movements of the support 30 always tending to keep the appropriate measuring mark centred in the field of view of device 17. When carriage 3 is moved continuously in at least one direction, a new mark 19 should be centred successively in the field of view. To achieve this a series of contact elements with a cooperating brush is provided for each lamp series 101 and 100. The contacts 110 and brush 111 are shown in FIGURE 7 for lamps 101. Contacts 110 are mounted on an insulated base supported on plate 1 and are engaged by brush 111 suspended but insulated from, carriage 2. A contact series for lamps 100 would be mounted on carriage 2 with a cooperating brush on carriage 3. The positions of each brush and its cooperating contacts may of course, be reversed. As shown in FIGURE 8 a power source 120 is connected to one side of each lamp in the series 101 and the other side of each lamp is connected to an individual one of the series of contacts corresponding to that lamp. The brush 111 is taken to the other side of the power source. If difficulty should arise due to the energising of two lamps at times when the brush 111 bridges two contacts so that the servo motors may centre one or other of the lamps over the corresponding photocell assembly, a system of interconnected relays between adjacent contacts which will allow only one of the lamps to be lit can be employed.

In FIGURE 8 brush 111 is shown engaging a pair (135 and 136) of the contacts 110. Each contact passes current from a battery 120 through windings 121 and 122 respectively of two adjacent relays, which current closes normally open switches 124 and 125 and opens normally closed switch 126. Current from the battery 120 is allowed to flow through lamp 132 only, lamp 131 remaining dark because of the opening of switch 126. If the brush 111 moves along the path 112 onto contact 135 alone, lamp 131 will light and 132 become extinguished through the subsequent closing of contacts 126 and opening of contacts 125. If the brush moves onto the contact 137 lamp 138 will be lit and 132 become extinguished, through closing of contacts 127 and opening of 128.

Figure 9:
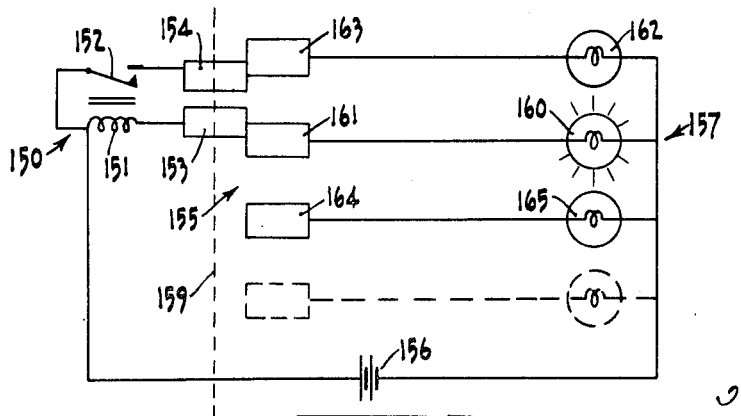
FIGURE 9 is a schematic circuit diagram of an alternative circuit to that of FIGURE 8.

A second and simpler system to avoid illumination of two adjacent lamps may be achieved with the circuit of FIGURE 9. A relay 150 has an energising winding 151 and normally closed contacts 152. One side of winding 151 and contacts 152 are respectively connected to ganged master and slave brushes 153 and 154 respectively. The brushes are insulated from one another and move together as a unit over contacts 155 in the direction indicated by the line 159. The brushes and contacts are mounted in a manner similar to that described for brush 111 and contacts 110. Each contact 155 is connected to one side of an associated lamp 157 and the other side of the relay winding 151 and contacts 152 are connected together, and are joined through a power source 156 to the other sides of lamps 157. Brushes 153 and 154 are sufficiently narrow that each cannot make electrical contact with a pair of adjacent contacts 155 but the pair of brushes 153 and 154 are so spaced apart that one at least is always in electric connection with a contact 155. In operation that lamp will be lit whose contact 155 is connected to the master brush 153. The current then drawn by the illuminated bulb is sufficient to open the relay contacts 152 and no other lamp will be illuminated even if the slave brush 152 is connected to a contact. In the position shown in FIGURE 9, lamp 160 will remain illuminated whilst the pair of brushes 153 and 154 is moved upward (in the FIGURE 9) until brush 153 leaves contact 161. Contacts 152 will then close and lamp 162 be illuminated by current flowing between brush 154 and contact 163. If the pair of brushes is moved downwards (in the figure) 160 will remain illuminated even after brush 153 has left contact 161 because current to contact 161 will be sustained through brush 154 by closure of contacts 152. As soon as master brush 153 reaches contact 164 current will flow between them, lamp 165 will be illuminated, contacts 152 will open, and lamp 160 will be extinguished.

In normal operation using the embodiment of FIGURES 6, 7, 8 and 9 the servo motors 107 and 108 will only be switched on after the image feature has been brought into view of the device 17. When the mark 19 has thus been roughly aligned with the feature by the servo assembly the motors will again be switched off so that accurate final alignment may be made by hand turning wheels 22 and 24.

I claim:

1. A precise comparator for measuring the coordinates of a feature on a plane featured surface in which the surface is mounted for movement in two directions in its plane at right angles, and viewing means for said feature, having the improvement which comprises, a transparent carrier having an accurately located planar pattern of marks arrayed in said carrier in coordinate form, each said marks being identified in said carrier as to their respective coordinate characters from a given point on the carrier with the coordinate identification being observable through said viewing means, means for causing said pattern to be in a plane optically coincident with the plane of said featured surface, and means for moving said carrier accurately over a distance in two directions at right angles relatively to and parallel to the plane of said surface sufficient to allow at least one of said marks to be brought into coincidence with said feature as observed in said viewing means, the algebraic sum of the observed coordinates for said one mark and the said two distances being the coordinates of said feature.

2. A comparator as defined in claim 1 wherein optically coincident causing means includes an optical assembly between said featured surface and said carrier for bringing said plane of said surface and of said pattern into optical coincidence, said assembly having a magnification of substantially unity and producing a real upright image.

3. A comparator as defined in claim 1 wherein said carrier is a transparent glass plate and said pattern comprises marks at the corners of squares, the sides of said squares being parallel to the directions of movement of said carrier.

4. A comparator as defined in claim 1, including a series of contact means, each contact means of said series being related to a particular mark in said carrier, means cooperating with said contact means, upon movement of said carrier to a position where said feature is in said viewing means, for indicating the mark in said carrier which is closest to said feature.

5. A comparator as defined in claim 1, including a series of lamps, each lamp of said series being related to a particular mark in said carrier, means operable in accordance with the relative position of the said feature in said featured surface and the viewing means for individually illuminating the lamp in said series most nearly adjacent said feature, and means sensitive to the illumination of said lamp for bringing the related mark into view of said viewing means.

(References on following page)

References Cited by the Examiner

UNITED STATES PATENTS

| 690,800 | 1/1902 | Walther | 340—282 |
|---|---|---|---|
| 2,495,416 | 1/1950 | McCauley | 73—308 |
| 2,871,759 | 2/1959 | Sconce et al. | 88—14 |

FOREIGN PATENTS 266,044  2/1927  Great Britain.

JEWELL H. PEDERSEN, *Primary Examiner.*

R. L. WIBERT, *Assistant Examiner.*